United States Patent Office 2,965,520
Patented Dec. 20, 1960

2,965,520

PROCESS FOR PREPARING LOW D.E. SIRUP

Edward C. Snyder, Hinsdale, and Earl R. Kooi, La Grange, Ill., assignors to Corn Products Company, a corporation of Delaware No Drawing. Filed Dec. 24, 1956, Ser. No. 630,020

2 Claims. (Cl. 127—38)

This invention relates to a starch hydrolyzate, low in D.E., which has, when concentrated, a lower viscosity and greater stability toward haze formation than presently known starch hydrolyzates of the same low D.E. level. By D.E. is meant dextrose equivalent, i.e., percent of reducing sugars on a dry basis, calculated as dextrose.

Starch hydrolyzates having a D.E. of about 18 to 35 D.E., and particularly 28–32 D.E., are eminently suitable for brewer's body sirups or as additives to aid in the spray drying of soluble products. However, the haze formation after concentration limits their usefulness and the high viscosity of the hydrolyzates makes them difficult to process. Sirups made from a 30 D.E. hydrolyzate in conventional manner have been found to haze within several weeks.

We have discovered that we can overcome these difficulties without changing the desirable characteristics of the starch hydrolyzates aforementioned. We have discovered that starch hydrolyzates with the improvements of stability toward haze formation and lowered viscosity upon concentration can be prepared by hydrolyzing starch with acid in conventional manner to a D.E. of about 18 to 35 followed by treating the resultant hydrolyzate with an enzyme of the alpha-amylase type which will partially hydrolyze the high molecular weight dextrins without substantially increasing the D.E. After the hydrolyzate is concentrated, the resultant sirup has all of the desirable characteristics of low D.E. sirups heretofore known but none of the undesirable features.

Acid and enzymatic conversions of starch are well known. However, prior practices in the enzymatic conversion of starch have been limited to solubilization of unhydrolyzed, gelatinized starch by alpha-amylase type enzymes, resulting in a product having essentially no reducing sugars, or to the treatment of enzyme liquified, acid liquified, or acid hydrolyzed starches with an enzyme having considerable saccharifying ability. This latter treatment results in an appreciable increase in D.E. due to the formation of substantial quantities of dextrose and/or maltose. Opposed to these methods, the present invention depends upon the treatment of partially acid hydrolyzed starch with a specific D.E. range with an alpha-amylase type enzyme in such manner that there is no substantial increase in the D.E. of the final hydrolyzate.

In carrying out the invention, starch is partially acid hydrolyzed in conventional mannear to a D.E. within the range of 18 to 35. The hydrolyzate is neutralized and then filtered. Thereafter the pH is adjusted, if necessary, to a value between 4 and 10 depending upon the type of enzyme selected. Most enzymes of the alpha-amylase type will convert high molecular weight dextrins in the aforementioned starch hydrolyzates to lower molecular weight products within the aforementioned pH range. The enzyme is then added to the material to be treated and the conversion is carried out at a temperature between about 50 and about 90° C. The amount of enzyme used depends upon the activity and time allowed for the reaction. After the reaction is carried out to the desired degree, the enzyme may be inactivated, the hydrolyzate decolorized and concentrated in conventional manner. Generally the finished sirup has a gravity of 42° Bé.

There are a variety of alpha-amylases on the market and any alpha-amylase of cereal, animal or microbiological origin is suitable for purposes of the present invention. Particularly suitable are the enzymes sold under the trademarks Rhozyme H–39 and C.P.R. 4 or 5 by Rohm & Haas Company and by Wallerstein, Inc., respectively.

In carrying out the invention in the laboratory, the substrate used was an acid hydrolyzate of starch at a D.E. value of 24.7. Four aliquots of this hydrolyzate, after pH adjustment, were treated with an alpha-amylase enzyme, sold under the trademark Rhozyme H–39 by Rohm & Haas Company, under the conditions shown in the table below. After the enzyme treatment was completed, 1.0 percent of activated carbon, D.B., was added to the liquors and the liquors were held 15 minutes at 170° F. The liquors were filtered and evaporated to the gravities shown in the table.

|  | Control | Enzyme Treatment | | |
| --- | --- | --- | --- | --- |
|  |  | A | B | C |
| Amount of Enzyme used percent D.B. | None | 0.008 | 0.016 | 0.032 |
| pH | 6.0 | 6.7 | 6.3 | 6.3 |
| Temperature of treatment, °F. | 170 | 170 | 170 | 170 |
| Length of treatment, hr. | 1 | 1 | 1 | 1 |
| Gravity of final product | 41.9 | 41.8 | 41.9 | 42.0 |
| D.E. of final product | 24.7 | 29.6 | 30.3 | 31.8 |

As can be readily determined from the above table, the maximum increase in D.E. of the final product obtained by the enzymatic treatment of the acid hydrolyzate over the D.E. of the control was exhibited by aliquot C and only amounted to 7.1 (i.e., 31.8−24.7=7.1). The percentage of maximum increase in D.E., calculated by dividing the maximum amount of increase in D.E. by the D.E. of the control (i.e., $7.1/24.7$) is about 29 percent.

The haze formed in previously known sirups and the high viscosities are undoubted'y due to high molecular weight bodies present. By means of our invention, these are broken down into lower molecular weight bodies without appreciably increasing the D.E. It will be apparent from the table below that the percentage of materials having a degree of polymerization (DP) greater than 7 is unexpectedly lower for our sirup than from corn sirup made in conventional manner.

| Type of Conversion | DP Above 7 percent, dry basis |
| --- | --- |
| Acid to 25 D.E. | 54.1 |
| Acid to 30 D.E. | 45.1 |
| Liquor A (Previous Table) | 34.0 |
| Liquor B | 31.0 |
| Liquor C | 28.6 |

As a consequence of the lower amount of high polymers (DP=7 and above), the sirups prepared with enzymes in accordance with the invention have a lower viscosity than non-enzyme treated sirup at equivalent D.E. and dry substance levels.

A plant run was made under the conditions shown below. Final D.E. and DP values are also shown.

| | |
|---|---|
| Original acid hydrolyzate—D.E. | 26.6 |
| Enzyme* dosage, percent D.B. | 0.01 |
| pH | 5.1–5.2 |
| Temperature during incubation °F | 160–165 |
| Time of incubation hour | 1 |
| Final gravity °Bé | 42.0 |
| Final D.E. | 29.6 |
| DP above 7 in percent: | |
|     Original acid hydrolyzate at 26.6 D.E. | 51.9 |
|     Enzyme treated hydrolyzate at 29.6 D.E. | 37.4 |
|     Acid hydrolyzate at 29.6 D.E. | 44.9 |

*Sold under trademark Rhozyme H-39 by Rhom & Haas Co.

We claim:

1. A process for preparing a low D.E. sirup stable to haze formation and with decreased viscosity which comprises acid converting starch to a D.E. value between 18 and 35, neutralizing and filtering the hydrolyzate and thereafter treating the hydrolyzate with an enzyme preparation consisting of alpha-amylase for one hour to break down high molecular weight bodies without increasing the D.E. value more than about 29 percent and concentrating the liquor to a sirup.

2. Process according to claim 1 wherein the enzyme is of microbiological origin and the treatment is carried out at a pH between 4 and 10 and at a temperature between 50° C. and 90° C.

References Cited in the file of this patent

UNITED STATES PATENTS

| | | |
|---|---|---|
| 2,153,445 | Willaman et al. | Apr. 4, 1939 |
| 2,571,541 | Cleland et al. | Oct. 16, 1951 |
| 2,609,326 | Pigman et al. | Sept. 2, 1952 |
| 2,662,842 | Christensen | Dec. 15, 1953 |
| 2,720,465 | Fetzer et al. | Oct. 11, 1955 |
| 2,738,305 | Lohmar et al. | Mar. 13, 1956 |

OTHER REFERENCES

Tauber: "Chemistry and Technology of Enzymes," 1949, published by John Wiley and Sons, Inc. (N.Y.), pp. 62 to 64.